United States Patent [19]

Fedkiw, Jr.

[11] Patent Number: 4,959,132
[45] Date of Patent: Sep. 25, 1990

[54] PREPARING IN SITU ELECTROCATALYTIC FILMS IN SOLID POLYMER ELECTROLYTE MEMBRANES, COMPOSITE MICROELECTRODE STRUCTURES PRODUCED THEREBY AND CHLORALKALI PROCESS UTILIZING THE SAME

[75] Inventor: Peter S. Fedkiw, Jr., Raleigh, N.C.

[73] Assignee: North Carolina State University, Raleigh, N.C.

[21] Appl. No.: 195,218

[22] Filed: May 18, 1988

[51] Int. Cl.$^5$ ............................. C25B 1/00; C25B 1/26
[52] U.S. Cl. ................................... 204/101; 204/128; 204/282; 204/291; 204/292; 427/77; 427/115; 427/400; 427/437; 502/101
[58] Field of Search ............... 204/128, 101, 282, 291, 204/292, 296, 283; 427/77, 399, 400, 437, 115; 502/101

[56] References Cited

U.S. PATENT DOCUMENTS

| | | | |
|---|---|---|---|
| 4,253,935 | 3/1981 | Simmons | 204/296 |
| 4,272,353 | 6/1981 | Lawrance et al. | 204/283 |
| 4,326,930 | 4/1982 | Nagel et al. | 204/20 |
| 4,386,987 | 6/1983 | Covitch et al. | 156/155 |
| 4,396,469 | 8/1983 | Banziger et al. | 204/24 |
| 4,421,579 | 12/1983 | Covitch et al. | 156/60 |
| 4,469,579 | 9/1984 | Covitch et al. | 204/283 |
| 4,563,371 | 1/1986 | Sirinyan et al. | 427/437 |

FOREIGN PATENT DOCUMENTS

| | | | |
|---|---|---|---|
| 0080766 | 5/1984 | Japan | 427/437 |
| 61-223191 | 10/1986 | Japan | . |
| 61-231190 | 10/1986 | Japan | . |

OTHER PUBLICATIONS

H. Takenaka, et al., *Solid Polymer Electrolyte Water Electrolysis*, Int. J. Hydrogen Energy, vol. 7, No. 5, pp. 397–403, 1982.

*Primary Examiner*—John F. Niebling
*Assistant Examiner*—Kathryn Gorgos
*Attorney, Agent, or Firm*—Bell, Seltzer, Park & Gibson

[57] ABSTRACT

Disclosed is a process for fabricating a thin, porous, electronically conductive, high-surface area film proximate the surface of a solid polymer electrolyte membrane. The film has highly desirable characteristics as a surface electrode. Films may be formed on both sides of the membrane to form a bi-polar structure useful in various processes, including chloralkali processes.

24 Claims, 8 Drawing Sheets

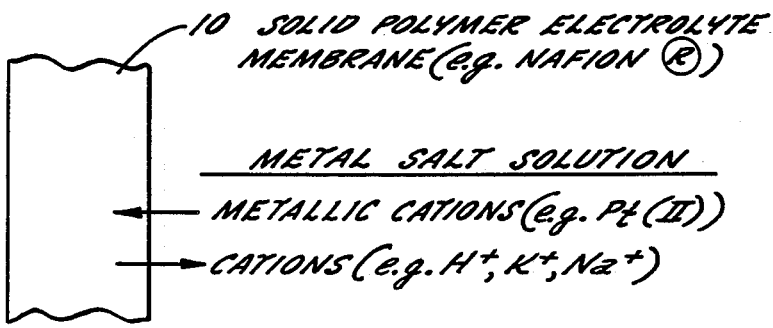
Fig. 1A.
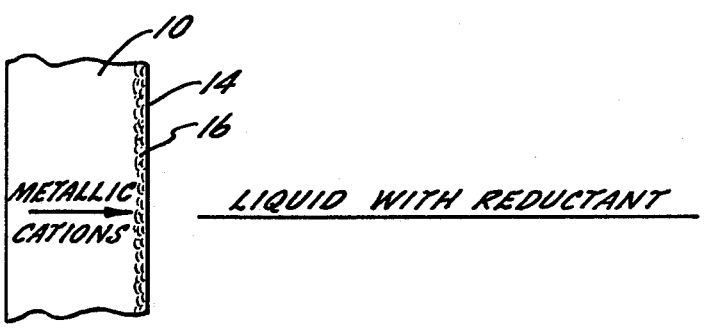
Fig. 1B.
Fig. 2A.
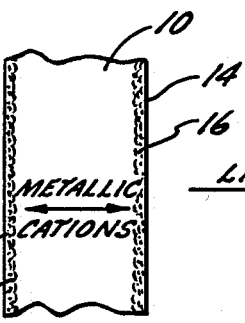
Fig. 2B.

PREPARING IN SITU ELECTROCATALYTIC FILMS IN SOLID POLYMER ELECTROLYTE MEMBRANES, COMPOSITE MICROELECTRODE STRUCTURES PRODUCED THEREBY AND CHLORALKALI PROCESS UTILIZING THE SAME

FIELD OF THE INVENTION

The invention relates to catalytic electrodes which are formed on solid polymer electrolytes. More particularly, the invention relates to the formation of metallic electrocatalytic films embedded proximate one or both of the surfaces of a solid polymer electrolyte membrane.

BACKGROUND OF THE INVENTION

A solid polymer electrolyte is a polymer that is capable of sustaining ionic charge transport. An excellent solid polymer electrolyte is NAFION ®, a perflourinated ionomer manufactured by Du Pont. NAFION ®, because it is entirely flourinated, is chemically stable and may be exposed to harsh oxidizing and reducing conditions without ill effect. It is known that if electrodes are placed on opposite faces of a NAFION ® membrane, cationic charge (protons) may be "pumped" across the solid polymer electrolyte from one electrode to the other, while each electrode carries out a half-cell reaction. A very desirable feature in this processing scheme is that there be a high surface area of contact between the ionomer matrix of the solid polymer electrolyte and the electrodes. Nevertheless, the electrode cannot cover the surface completely, otherwise the reactant would be blocked from reaching the reactant sites, namely, the electrode-solid polymer electrolyte interface.

Prior art processes for depositing metallic electrodes on the surface of solid polymer electrolytes include mechanically pressing metal particles onto the surface. Patents illustrative of the mechanical approach are U.S. Pat. Nos. 4,272,353; 4,386,987; 4,421,579 and 4,469,579.

According to other prior art practices, noble metals and their alloys have been directly attached to both sides of perfluorosulfonic acid polymer membranes by plating methods utilizing reactions of a metal salt solution with a reducing agent on the membrane surface. According to this method, a reductant, e.g., $N_2H_4$, diffuses through the membrane and reduces the noble metal of the salt (e.g., $Pt(IV)(CL)_6^{-4}$) to produce a platinum coating deposited on one face of the film. This procedure is described in Takenaka, H., et al., "Solid Polymer Electrolyte Water Electrolysis," *Int. J. Hydrogen Energy* 5, 397–403 (1983).

A method of electrolytic deposition of a metallic electrode on a solid polymer electrolyte is described in U.S. Pat. No. 4,326,930. The two-step method of this patent involves the impregnation of a solid polymer electrolyte with Pt(II) cations by impregnation with a cationic salt, followed by placing this impregnated solid electrolyte material between an anode and cathode to "electrolyze" the metal ions and to deposit a metal layer along the surface of the electrolyte adjacent the cathode. A method for continuously coating a solid polymer electrolyte by this process is disclosed in U.S. Pat. No. 4,396,469.

There is a great deal of interest in solid polymer electrolyte catalytic electrodes because they have utility in fuel cells, sensors, chloralkali processes, dialysis, water electrolysis and, at a more exploratory level, in electroorganic synthesis. Among others, the benefits of solid polymer electrolytic cells are: (1) the polymer serves the dual purpose of electrolyte and separator; (2) mass transfer limitations caused by the limited solubility of gaseous reagents in a liquid electrolyte are avoided; and (3) solid polymer electrolyte cells can be fabricated as a thin film which reduces the weight and ohmic losses.

Despite extensive activity in the production and use of electrodes of the mentioned type, and the many structures and processes proposed, both speculative as well as experimentally evaluated, the need still exists for an effective and commerically viable process for reliably forming such electrodes.

SUMMARY OF THE INVENTION

The present invention provides a novel and versatile process commercially suitable for producing a wide range of in situ catalytic electrode structures formed in solid polymer electrolytes. According to the preferred manner of practicing the invention, the structures produced by the invention take the form of thin, porous, electronically conductive, high-surface area, in situ metallic films formed proximate one or both surfaces of a solid polymer electrolyte membrane. The fabrication procedure is straightforward and particularly well suited for commercial application.

In one aspect, the present invention comprises placing metal ions into the ionomer matrix of a solid polymer electrolyte membrane to produce a metal-ion-loaded membrane. The metal ions are selected as those which will constitute the chemical composition of the electrocatalytic film. Next, at least one face of the metal-ion-loaded membrane is exposed to a chemical reductant to cause the metal ions in the membrane to diffuse towards the exposed face and to reduce the ions to the metal(0) state, thereby producing an in situ electrocatalytic film proximate the membrane surface.

The composition of the film may take the form of a single metal, an alloy or a mixed metal depending upon the selection of metal ions placed into the ionomer matrix.

The solid polymer electrolyte membrane may take the form of a cation-exchange membrane in which case the selected electrode metal is introduced as a cationic salt of the metal. The membrane may also take the form an anion-exchange membrane in which case the metal is introduced as an anionic salt of the metal.

In the preferred method of practicing the invention the ion exchange is performed utilizing a co-solvent in conjunction with an ionic salt of the selected metal to swell the solid polymer electrolyte and to thereby increase the loading level and lower diffusional resistance therein. Furthermore, as stated elsewhere herein, the use of this invention to produce a bi-polar structure with metallic electrocatalytic films at both faces of the solid polymer electrolyte membrane is envisioned.

In another aspect, the present invention takes the form of a composite metal-ionomer catalytic electrode structure characterized by large surface-area-per-unit volume of the electrode material and protection of the electrode from chemical and mechanical degradation by forming the same within the membrane. This structure includes an ionomer matrix forming a solid polymer electrolyte membrane and a thin, porous, electronically conductive film of metal proximate at least one face of the membrane. The deposit is formed in situ within the ionomer matrix and has a morphology characterized by metal particles that provide a large surface-area-per-unit volume and which are electronically coherent with each other.

In yet another aspect, the present invention comprises a chloralkalai process of the type wherein respective anode and cathode reaction zones are separated by a solid polymer electrolyte membrane. The process comprises the steps of: providing a cathode reaction zone suitable for conducting a gas phase reaction therein; providing an anode reaction zone suitable for conducting a liquid phase reaction therein; providing, in the space between the anode and cathode reaction zones, a bi-polar structure comprising a solid polymer electrolyte membrane with a thin, porous, electronically conductive, high-surface-area metallic electrocatalytic film formed in situ at each surface thereof; connecting the films of the bi-polar structure to a power supply so that one film serves as the anode and one film serves as the cathode; conducting the following half cell reaction at the anode:

$4Cl^- \rightarrow 2Cl_2 + 4e^-$;

conducting the following half cell reaction at the cathode:

$O_2 + 4H^+ + 4e^- \rightarrow 2H_2O$;

utilizing the high surface area of contact between the ionomer matrix of the solid polymer electrolyte and the electrodes to facilitate the reactions; removing chlorine gas and spent brine from the anode reaction zone; and removing $H_2O$ plus any excess gas from the cathode reaction zone.

DESCRIPTION OF THE DRAWINGS

FIGS. 1A and 1B are schematic illustrations of the two-step process of the present invention as utilized to prepare an electrode proximate only one face of a solid polymer electrolyte membrane.

FIGS. 2A and 2B are schematic illustrations of the two-step process of the present invention as utilized to prepare a bi-polar structure having electrodes on both faces of a solid polymer electrolyte membrane.

Figure 3:
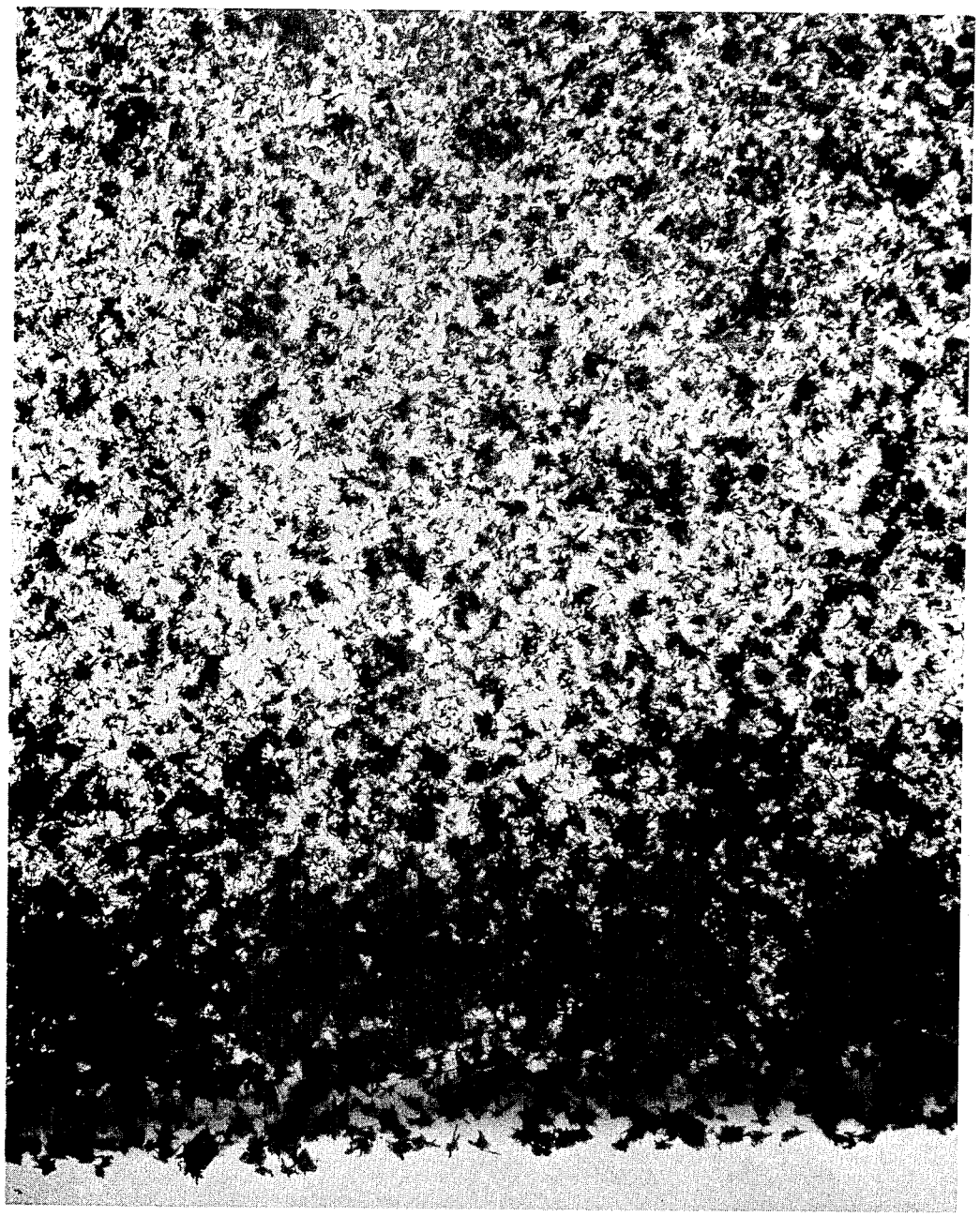
FIG. 3 is a transmission electron micrograph (TEM) of the cross section of the edge portion of a solid polymer electrolyte membrane which includes an in situ electrocatalytic film prepared in accordance with the present invention.

It will be appreciated that the TEM pictures of FIGS. 3-6 are at different magnifications. A scale marker of either 0.1 micron or 1 micron is provided in each TEM picture for the purpose of identifying magnification. The dark areas of the TEM's are metal (platinum) and the light areas are the NAFION ® membrane or the epoxy that was used to mount the TEM sample.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

FIG. 1A schematically illustrates the first step of the two-step process of the present invention. The first step is an impregnation process in which a solid polymer electrolyte membrane 10, e.g., a perfluorosulfonic acid polymer membrane manufactured by DuPont under the name NAFION ®, is impregnated with an ionic salt or salts of the desired metal, alloy or mixed metal to be used as the electrode. The illustrated method of impregnating membrane 10 is by saturating membrane 10 utilizing a cationic metal salt solution. The metal cations of the salt move into membrane 10 by ion exchange, replacing cations at sites in the membrane. The replaced cations may be, for example, $H^+$, $K^+$, $Na^+$, according to the structure of the membrane and any pre-impregnation preparation of the membrane. The metal salt solution may be formed by dissolving the salt in a co-solvent such as $CH_3OH/H_2O$. The concentrations of the solution, pH of the solution, temperature and the time of immersion of the membrane in the metal salt solution may be controlled in order to tailor the impregnation step to acheive desired "loading" characteristics.

FIG. 1B illustrates the second step, or reduction step, of the two-step process as utilized to form an electrocatalytic film proximate only one face of membrane 10. As shown in FIG. 1B, membrane 10 is placed between a liquid containing a reductant and a non-reactive medium, e.g., nitrogen gas. The presence of the reductant causes a physical process to occur, namely, the diffusion of metallic cations toward the surface of the membrane. The reductant also causes chemical reduction of the impregnated metallic cations to the metal(0) state and the formation of an electrocatalytic film 14 proximate the membrane surface 16. As explained below, the thickness and morphology of the electrocatalytic film and the electrochemical activity of the resultant composite structure may be tailored by controlling the "loading" of the membrane in the impregnation step. The tailoring also occurs by selection of appropriate cationic, anionic or neutral reductants, by appropriate temperature and time controls throughout the reduction process and by proper balancing of the physical and chemical phenomena referred to above.

While the reductant discussed above, and those discussed in the Examples are liquid, it will be appreciated that in certain applications the reductant may be a gas, e.g., hydrogen gas. Also, the reductant may take the form of a so-called "neat" reductant, e.g., methanol.

FIGS. 2A and 2B illustrate the impregnation and reduction steps, respectively, of the process of the invention as utilized to form a bi-polar structure. The impregnation step is the same, except that the membrane preferably is exposed to the metal salt solution on both sides. Likewise, in the reduction step both sides of the membrane are exposed to the liquid containing the reductant. The end product includes a first electrocatalytic film 14 proximate membrane surface 16 and a second electrocatalytic film 20 proximate membrane surface 22.

The immediately preceding portion of the specification describes in general terms the methodology for preparing in situ electrocatalytic films in solid polymer electrolyte membranes, e.g., NAFION ® membranes. It will be appreciated that one primary advantage of the present invention is that the thickness and morphology of the film may be varied according to need by control of the chemical and physical conditions used during the impregnation step and the reduction step. As representative of the ability to "tailor" the deposits to the needs of the user, several examples of methods of practicing the invention will now be described.

As used in these Examples, the oxidation states of certain metal ions described will be set forth in their Roman numeral designation rather than their oxidation number superscript designation; e.g., Pt(II) rather than Pt+2.

EXAMPLE 1

A NAFION ® 117 membrane having a dry thickness of 200–250 microns was utilized as the solid polymer electrolyte membrane. The membrane was boiled in a 1M solution of NaCl for 1 hour in preparation for the impregnation step in order to place Na+ cations in the membrane by ion exchange. The membrane was impregnated with Pt(II) cations by immersing the membrane in a co-solvent of CH$_3$OH/H$_2$O (e.g., 25%/75% by volume) which contained a 0.026 wt% solution of Pt(NH$_3$)$_4$Cl$_2$. The membrane was immersed for 24 hours at 50° C. to achieve "equilibrium" loading. Next, the reduction step involved positioning the impregnated membrane between a nitrogen gas medium on one side and a 0.1M solution of sodium borohydride, formula NaBH$_4$, for 2 hours at 50° C. The dissociation of the reductant in the solution resulted in Na+ ions and BH$_4^-$ ions. The BH$_4^-$ ions served as the anionic reducing agent. As explained in more detail below, the anionic nature of the reducing agent decreases its penetration rate into the membrane, as compared to the use of a neutral reducing agent (e.g., N$_2$H$_4$) or a cationic reducing agent (e.g., the Sn$^{+2}$ cations of a Sn(SO$_4$) reductant). The oxidation half cell reaction was:

The net process reaction was:

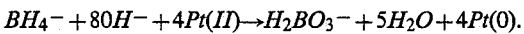

The Pt(II) cations within the membrane diffused toward the surface adjacent the NaBH$_4$ reductant and were reduced to form the in situ or embedded Pt(0) electrocatalytic film shown in the TEM of FIG. 3. The resultant metallic film illustrated in FIG. 3 has a morphology characterized by dendritic, needle-like growth of the in situ platinum particles and a high number density of the particles. While not apparent from FIG. 3, the film has an average thickness on the order of 10 microns. The film has a platinum surface area of approximately 10 m$^2$/gm Pt at a loading of 4 mg Pt/cm$^2$. The electronic ohmic resistance for the deposited film across the membrane (perpendicular to the surface) is greater than 20,000 ohms, while parallel to the surface it is approximately 5 ohms across a one inch diameter disk.

EXAMPLE 2

The impregnation step was identical to that of Example 1. The reduction step was the same as Example 1 except that (1) the temperature was reduced to 10° C. and (2) the reduction duration was increased to 20½ hours to permit completion of the chemical reaction. (The reduced temperature resulted in a slower chemical reaction.) The resultant film shown in FIGS. 4A and 4B had an average thickness on the order of 2–3 microns, as compared to the film thickness of approximately 10 microns produced at the higher temperature of Example 1. It is believed that lowering the reaction temperature slowed the chemical reaction rate substantially more than it may have slowed the physical aspect of the process; i.e., the diffusion of the Pt cations toward the surface of the membrane. Thus, the Pt cations were able to diffuse farther toward the surface on average before being reduced and immobilized in the ionomer matrix—resulting in a thinner film.

The film produced by the lower temperature process of Example 2 had a higher platinum density as compared to the film of Example 1. This is a direct result of the reduced thickness of the film of Example 2. Stated simply, a thinner film containing substantially the same weight of platinum has a greater platinum density than a thicker film.

The platinum particle size of the films produced by the lower temperature process of Example 2 were larger than those produced in Example 1, and had a similar, but somewhat less, dendritic, needle-like morphology. Both films were electrically coherent.

In Example 2 the electronic ohmic resistance of the deposited film across the membrane was greater than 20,000 ohms, while parallel to its surface it was approximately 5 ohms across a one inch diameter.

EXAMPLE 3

Figure 5A:
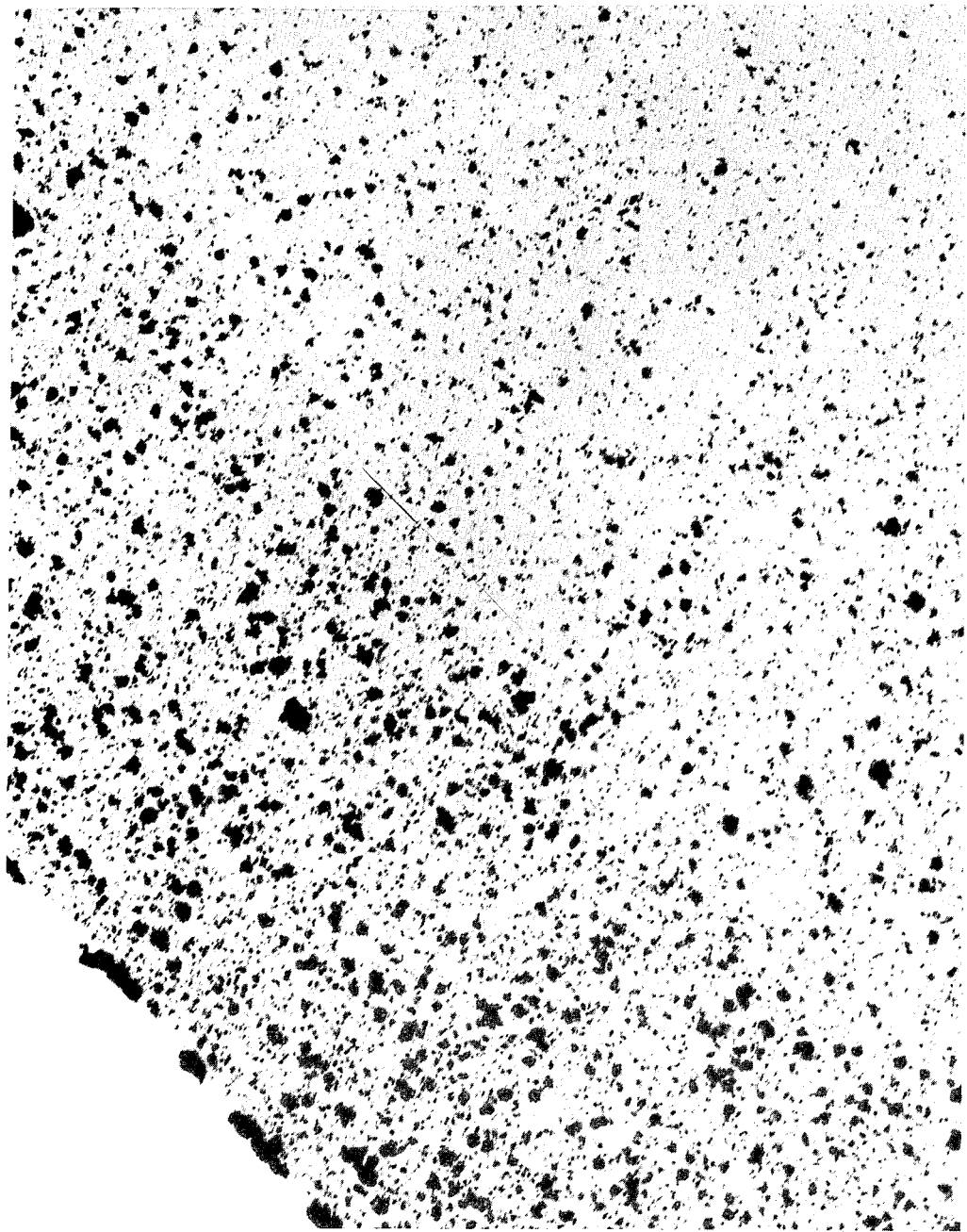
FIG. 5A is a TEM picture of another membrane incorporating an electrocatalytic film prepared by yet another set of process parameters.
Figure 5B:
FIG. 5B is a TEM picture on a greatly enlarged scale showing the morphology of the electrocatalytic film illustrated in FIG. 5A.

The impregnation step was identical to that of Example 1 except that the weight percentage of Pt(NH$_3$)$_4$CL$_2$ in the impregnation solution was increased to 0.26 wt%, resulting in loading approximately 5 times as much platinum into the membrane. As with Example 1, the loading was accomplished over a period of time sufficient to assure equilibrium in the loading condition. The reduction step was also identical to Example 1 except that the duration of the reduction step was increased to 20½ hours to permit completion of the chemical reaction. (It took longer simply because there was more platinum to reduce). Referring to FIGS. 5A and 5B, the platinum particles produced by the process of Example 3 are substantially larger, by a factor of 5 to 10, than those produced in Example 1. These particles are still dendritic, but even less so than those produced by the processes of Examples 1 and 2.

The electrocatalytic film thickness obtained by Example 3 is approximately the same as that of Example 1, i.e., on the order of 10 microns. However, the platinum density of the film is substantially greater than that achieved in Example 1 due to the substantially greater loading of platinum into the membrane. In fact, the platinum density of the film of Example 3 is comparable to that of the much thinner film produced by Example 2.

EXAMPLE 4

The impregnation step was identical to that of Example 1. The reduction step, however, utilized a 0.1M solution of $SnSO_4$ in a 1M solution of $HNO_3$ (one molar nitric acid) which was maintained in contact with the membrane for two hours at a temperature of 50° C. The oxidation half cell reaction was:

$$Sn(II) \rightarrow Sn(IV) + 2e^-.$$

The net process reaction was:

$$Sn(II) + Pt(NH_3)_4^{+2} \rightarrow Sn(IV) + Pt(0) + 4NH_3.$$

The cationic nature of the reducing agent, the Sn cations, causes the Sn cations to penetrate rapidly into the membrane.

Figure 6:
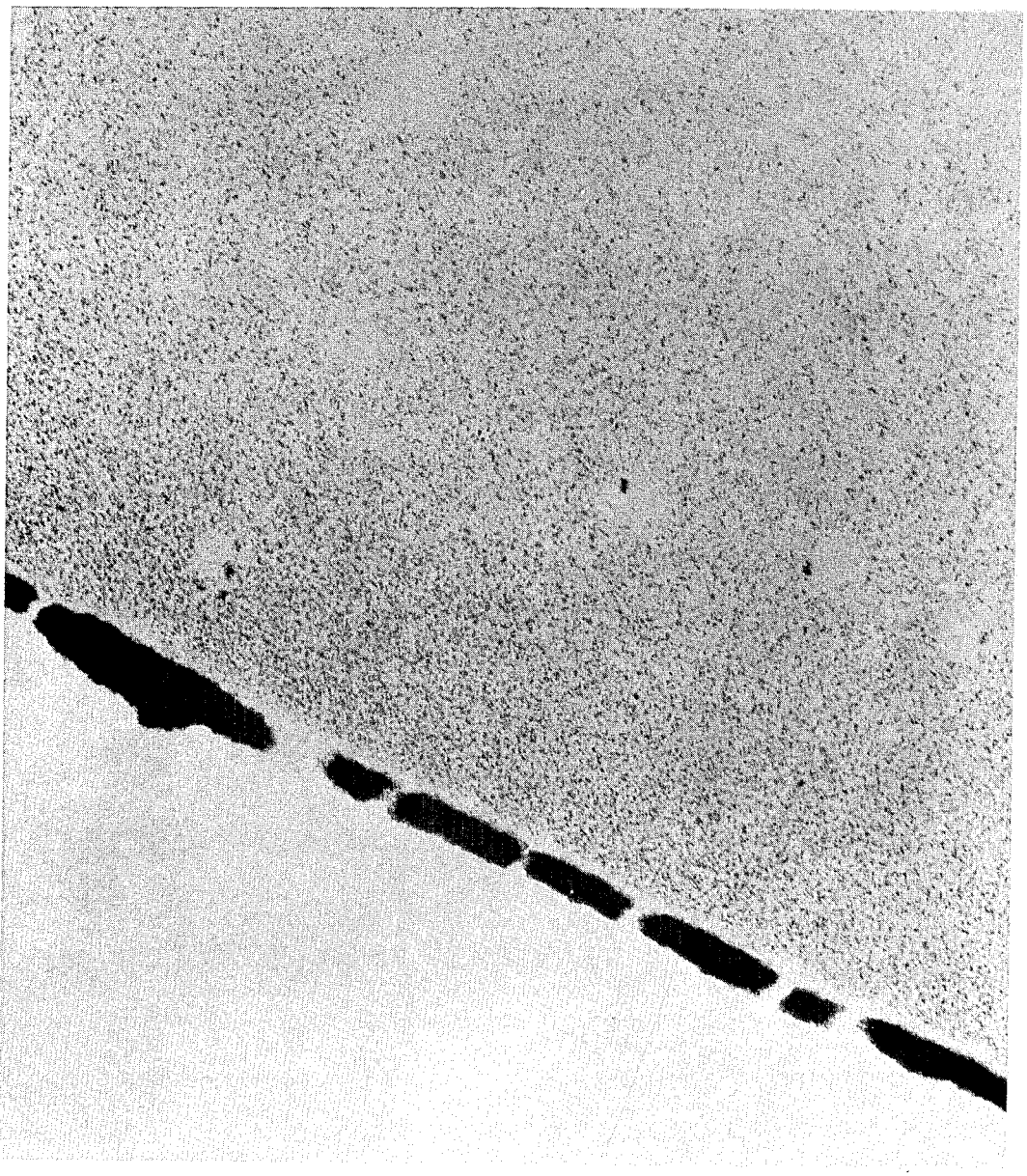
FIG. 6 is a TEM picture of the electrocatalytic film region of another metallized membrane and showing a dense surface layer of approximately 0.1 micron thickness and a less dense electrocatalytic film proper.

The film produced by the process of Example 4 is shown in FIG. 6. While the entire width of the membrane is not shown in FIG. 6, platinum particles are distributed throughout the width of the membrane. The number density of the platinum particles is such that there was a very dense surface layer having a thickness on the order of 0.1 micron (illustrated as the substantially solid region in FIG. 6) with the number density of the platinum particles decreasing from the surface toward the center of the membrane. While the platinum particles at and near the surface were electrically coherent, the particles were not coherent across the full width of the membrane. This was confirmed in that the electronic ohmic resistance for the deposited film across the membrane was greater than 20,000 ohms.

EXAMPLE 5

Figure 7:
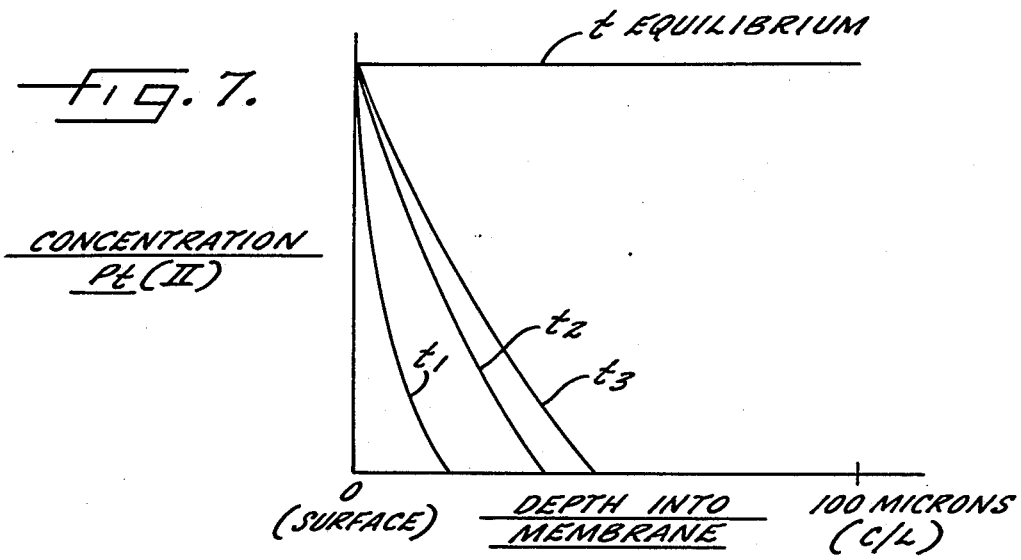
FIG. 7 is a graph showing the loading level of metal ions into the solid polymer electrolyte membrane as a function of time.

The process is the same as Example 4 except that equilibrium is not reached in the impregnation step. Instead the "loading" of Pt(II) ions into the NAFION ® membrane is reduced by reducing the impregnation time. Referring to FIG. 7, the concentration of Pt(II) ions in the membrane from the membrane surface to the membrane center line (approximately 100 microns from the surface) is shown by the several curves as being a function of the duration of the impregnation step. The upper curve, labeled "t equilibrium," shows full impregnation to the equilibrium condition achieved across the width of the membrane. This was the loading condition achieved in Examples 1–4. However, at lesser time durations, exemplified by the curves labeled $t_1, t_2, t_3$, the loading does not reach the equilibrium state, resulting a lesser overall impregnation of Pt(II) ions and a distribution of those ions toward the membrane surface.

The reduction step of Example 5 is the same as in Example 4 except that the time for complete reduction of the Pt(II) ions is less due to the smaller number of such ions.

A morphology of the structure produced by Example 5 is very similar to that of Example 4 (FIG. 6). The structure has a high number density at the surface, almost as high as that illustrated in FIG. 6. However, the low loading effectively eliminates the coherent, occluding dense film at the surface layer.

EXAMPLE 6

Palladium (Pd) is used instead of platinum as the electrode metal. The impregnation step is substantially below equilibrium and produces a low loading level of Pd(II) ions concentrated near the membrane surface. The reduction step utilizes a solution of $SnSO_4$ as the reductant. The chemical reduction is carried out immediately after impregnation to reduce ion migration and is continuous until complete reduction of the Pd(II) to Pd(0), resulting in a thin surface layer of Pd(0) "clusters" or nucleii at the membrane surface. These clusters serve as sites for electroless deposition. Next the membrane is impregnated again with a 0.26 wt.% solution of $Pt(NH_3)Cl_4$ at a desired loading level, followed by reduction utilizing a good electroless reducing agent such as $HPO^-_2$ (from a $NaHPO_2$ solution). The resultant morphology is an in situ dendritic growth of high surface area.

EXAMPLE 7

An in situ platinum electrocatalytic film is formed in a NAFION ® membrane by the process of Example 1. Next, a "current collector" is formed at the surface of the membrane by (1) impregnating the membrane with a low loading of Pt(II) ions using a 0.10 to 0.15 wt% solution of $Pt(NH_3)_4Cl_2$ carried in a $CH_3OH/H_2O$ (25%/75% by volume) co-solvent and (2) reducing the Pt(II) ions using an $N_2H_4$ reductant.

It is known in the art that electrical connection of an electrode at the surface of a solid polymer electrolyte to a power supply may be facilitated by a current collector, e.g., a permeable graphite cloth. The purpose of the second set of impregnation/reduction steps of Example 7 is to form a relatively dense, yet permeable, surface layer that serves as a current collector for the electrocatalytic layer that was formed previously by the process of Example 1.

It will be appreciated that the current collector may be formed first, followed by the formation of the electrocatalytic film; however the sequence of Example 7 is preferred.

Identification of Certain Metals, Alloys and Mixed Metals Used to Form Electrocatalytic Films of the Invention In order to facilitate discussion and streamline the specification, the above discussion and Examples have focused on the use of platinum to form electrocatalytic films composed of a single metal, usually platinum. However, it will be appreciated that other metals may be used to form single metal films, and that combinations of metals may be used to form alloy or mixed metal films.

The following salts have been put into metallic salt solution (preferably in conjunction with a co-solvent) and impregnated into NAFION ® membranes:

$CuCl_2$
$CoCl_2$
$Pb(NO_3)_2$
$Ag(NO_3)$
$Pd(NH_3)_2(NO_2)_2$.

In each case a reduction step (utilizing, e.g., a 1M solution of hydrazine at 50° C.) has been used to form a thin, electrocatylic, single metal film of Cu, Co, Pb, Ag or Pd proximate a surface of the NAFION ® membrane. Films of alloys also may be produced. For example, the impregnation step is carried out utilizing a metal salt solution of a Ru salt plus a Pt salt to load the membrane with Ru and Pt ions. Upon reduction (utilizing, e.g., a 1M solution of hydrazine at 50° C.) a thin, electrocatalytic Ru/Pt alloy film is produced proximate the surface of the NAFION ® membrane. Other alloys that have been identified for the films include Sn/Pt and Pd/Pt.

Films of mixed metal composition are produced by utilizing metals that have little or no affinity for each other in the zero oxidation state. For example, a metal salt solution of an Ag salt and a Pt salt may be used to impregnate the membrane with Ag and Pt ions. Upon reduction (utilizing, e.g., a 1M solution of hydrazine at 50° C.) a thin, electrocatylic Ag/Pt mixed metal film is produced proximate the surface of the NAFION ® membrane. Other mixed metal films that have been identified include Ag/Cu, Pb/Pt, Pb/Pd and Pb/Ag.

Characteristics of the Films of the Invention and Utilization of the Films in Electrochemical Reactors (e.g., Chloralkali Processes)

The Examples above illustrate that films comprising metallic particles may be prepared in situ in solid polymer electrolyte membranes, and that the size of the particles, electrical coherence of the particles, numerical distribution of the particles within the membrane, and other film characteristics may be tailored by controlling the loading-level of the metal ions in the impregnating step, and by controlling the temperature, chemical nature and concentration of the reductant. This "tailoring" aspect of the invention will be discussed immediately below, along with a discussion of the desirable characteristics of catalytic electrodes, and how films of the invention may be tailored to optimize their use in catalytic electrodes, particularly for use in electrochemical reactors. In order for a bi-polar composite membrane/film structure of the invention to have utility in an electrochemical reactor, the following are required: (1) the films proximate each surface of the membrane must be electronically coherent, i.e., the particles comprising the films must be in electrical contact, (2) the surfaces of the composite structure must be sufficiently permeable to gas flow to permit the transflow of gas necessary for the electrochemical process; i.e., the surfaces may not be occluded and (3) the two films must be electrically isolated from each other so that they may independently serve as anode and cathode in the process.

All of the above may be achieved in composite structures of the membranes by tailoring the process parameters. For example, FIG. 3 illustrates a film having an electrically coherent film (thickness approximately 10 microns) comprising individual platinum particles that have a dendritic, needle-like morphology. The particles of the film provide a large surface area per unit volume, thereby permitting efficient interchange with the ionomer matrix of the membrane, while holding to a minimum the quantity of precious metal that must be deposited.

Figure 4A:
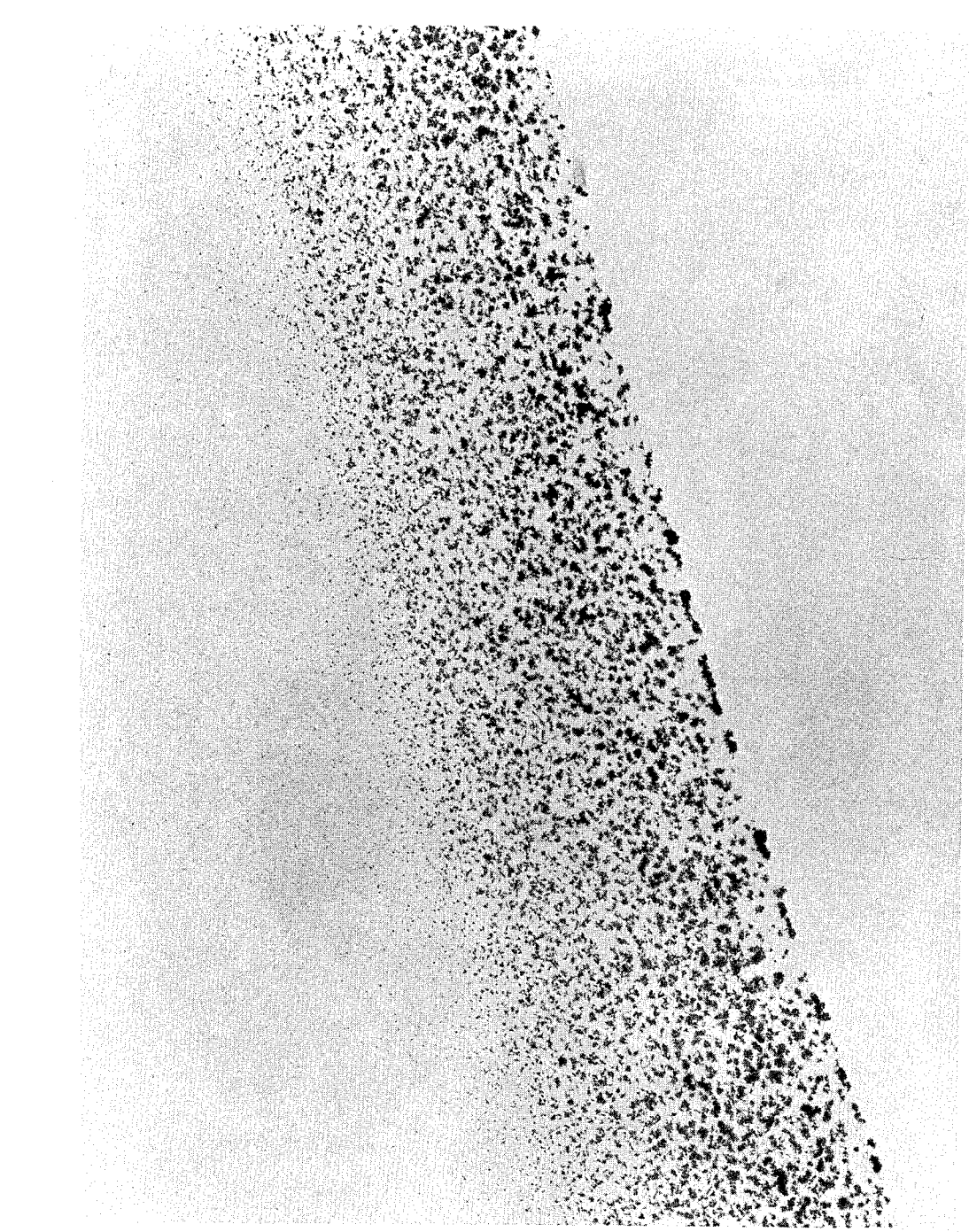
FIG. 4A is a TEM picture of a portion of another membrane including an electrocatalytic film prepared under different process parameters.
Figure 4B:
FIG. 4B is a TEM picture of a portion of the electrocatalytic film region illustrated in FIG. 4A which is greatly enlarged (approximately 30X-40X greater than FIG. 4A) and showing in greater detail the dentritic morphology of the deposited metal particles.

As an example of tailoring the films to particular needs, as noted above the film of Example 1 (FIG. 3) is thicker (10 microns vs. 2–3 microns) and has a different morphology than the film of Example 2 (FIGS. 4A and 4B). It may be desirable to achieve the morphology of Example 1 on a thinner, 2–3 micron film. This may be achieved by modifying the process of Example 1 to reduce impregnation time and loading level.

As a further example of tailoring the deposit of metal into the membrane, it will be appreciated that the process parameters may be chosen to produce homogeneously dispersed and electronically isolated metal microparticles within the ionomer matrix of the invention. Such a structure is not useful for direct electrochemical reaction because of the electronic isolation of the particles, but the particles can serve as heterogeneous catalytic sites for simultaneous oxidation and reduction processes, for example, simultaneous hydrazine oxidation and nitrogen dioxide reduction. Such deposits have been achieved by impregnating a NAFION ® membrane to equilibrium with a co-solvent solution including 0.05 wt% $Pt(NO_2)_2(NH_3)_2$, followed by reduction with a 1M solution of $NaBH_4$ at pH 13 and a temperature of 50° C. The resultant structure had a homogeneous dispersion of spherical platinum particles with an average diameter on the order of 10 nm. The particles, while electronically isolated, were sufficient in size and number for certain applications mentioned above.

The use of the invention in association with electrochemical reactors, particularly a chloralkali process, will now be discussed. In a traditional chloralkali process utilizing a perflourinated cation exchange member, e.g., NAFION ®, anode and cathode structures are physically attached to a NAFION ® membrane. On the anode side of the membrane, an NaCl brine is introduced. The $Na^+$ ions from the brine diffuse throughout the membrane to the cathode side while the $Cl^-$ ions react ($2Cl^- \rightarrow Cl_2 + 2e^-$) to form chlorine gas. The cathode side receives an input of water which undergoes the reaction $2H_2O + 2e^- \rightarrow 2OH^- + H_2$. Together with the $Na^+$ ions that crossed the membrane, caustic soda (NaOH) is formed at the cathode side.

As an alternative process, where there is no need to produce caustic soda, $O_2$ reduction may be used ($O_2 + 4H^+ + 4e^- \rightarrow 2H_2O$). The chemicals industry finds the alternative process to be particularly attractive because the energy demands are significantly reduced for chlorine production with an oxygen-depolarized cathode. The bi-polar electrodes of the present invention have application to both the traditional and alternative process, but are especially well suited to the alternative process because of the gas phase at the cathode.

Figure 8:
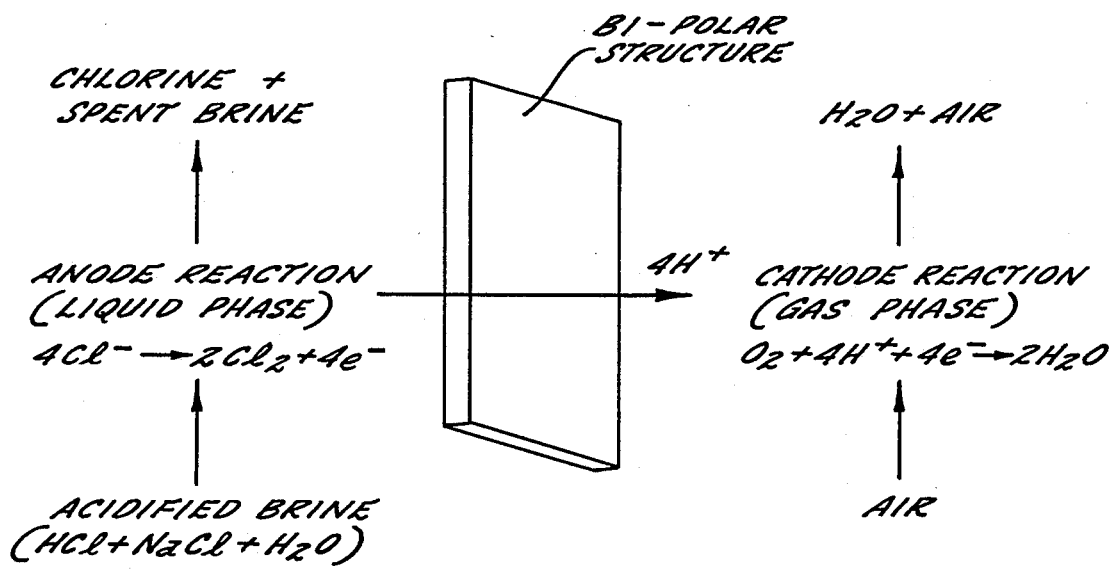
FIG. 8 is a schematic representation of a chloralkali process and system which utilizes bi-polar structures of the present invention.

The alternative process, utilizing a bi-polar structure of the present invention, is schematically shown in FIG. 8. The bi-polar structure is generally that shown in FIG. 2B. It includes a pair of in situ electrocatalytic films, one proximate each surface of the solid polymer electrolyte membrane. The films are connected to a power supply to serve as the anode and cathode of the chloralkali system. The bi-polar structure separates the anode reaction zone (liquid phase) from the cathode reaction zone (gas phase). The half cell reaction at the anode is:

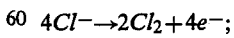

$4Cl^- \rightarrow 2Cl_2 + 4e^-$;

The half cell reaction at the cathode is:

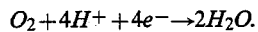

$O_2 + 4H^+ + 4e^- \rightarrow 2H_2O$.

Chlorine gas and spent brine are removed from the anode reaction zone. $H_2O$ plus any excess gas (e.g., excess air) is removed from the cathode reaction zone.

It will be appreciated that the reactions are facilitated by the high surface area of contact between the ionomer matrix of the NAFION ® membrane and the electrodes, particularly at the cathode side. Advantages of the bi-polar structure in this application include: (1) the full utilization of the film metal surface area; (2) the lowering of bubble-induced ohmic losses; and (3) less erosion losses of the electrode material since it is located in situ or embedded within the membrane.

While certain embodiments of this invention have been discussed herein, it will be appreciated that modifications may be made without departing from the true spirit and scope of the invention.

That which is claimed is:

1. A process for producing an in situ metallic electrocatalytic film proximate the surface of a solid polymer electrolyte membrane to form a composite structure useful in promoting electrochemical reactions in fuel cells, sensors, chloralkali processes, dialysis, or electrochemical synthesis cells, said method comprising the steps of:

loading metal ions into the ionomer matrix of a solid polymer electrolyte membrane to achieve a loading level of metal ions sufficient for forming an electronically coherent film of metal within the ionomer matrix, said metal ions being selected as those which will constitute the chemical composition of the electrocatalytic film; and exposing at least one face of the metal-ion-loaded membrane to a chemical reductant under controlled conditions of time and temperature sufficient to cause the metal ions in the membrane to diffuse towards the exposed face and to be reduced to the metal (0) state while within the membrane, and to produce in situ within the ionomer matrix of the membrane an electronically coherent porous film of metal located predominately within the membrane and near its surface, the electronically coherent film being comprised of metal particles in electrical contact with one another.

2. A process as claimed in claim 1 wherein the membrane is a cation-exchange membrane and the selected electrode metal is introduced as a cationic salt of the metal.

3. A process as claimed in claim 1 wherein the membrane is an anion-exchange membrane and the selected electrode metal is introduced as an anionic salt of the metal.

4. A process as claimed in claim 1 wherein the placing of metal ions into the ionomer matrix is performed by ion exchange utilizing a co-solvent in conjunction with an ionic salt of the selected metal to swell the solid polymer electrolyte and thereby increase the loading level and lower diffusional resistance therein.

5. A process as claimed in claim 1 wherein both faces of the solid polymer electrolyte membrane are exposed to the reductant, thereby producing a bi-polar metal-ionomer-metal composite structure with metallic electrocatalytic films at both faces connected only by an ionic-current path through the ionomer matrix.

6. A process as claimed in claim 1 wherein the solid polymer electrolyte membrane is selected from the group consisting of a perfluorosulfonic acid ionomer and a perfluorocarboxylic acid ionomer.

7. A process as claimed in claim 6 wherein said ionomer is a perfluorinated ionomer.

8. A process as claimed in claim 1 wherein the selected electrode metal is a noble metal.

9. A process as claimed in claim 8 wherein the electrode metal is platinum which is impregnated into the membrane by utilizing a cationic salt selected from the group consisting of $Pt(NH_3)_4Cl_2$ and $Pt(NO_2)_2(NH_3)_2$.

10. A process as claimed in claim 9 wherein said salt is utilized in conjunction with a co-solvent.

11. A process as claimed in claim 10 wherein the co-solvent system is $CH_3OH/H_2O$.

12. A process as claimed in claim 1 wherein the reductant is dissolved in a solvent.

13. A process as claimed in claim 1 wherein the reductant is a neat reactant.

14. A process as claimed in claim 1 wherein the reductant is a gas.

15. A process as claimed in claim 1 wherein the reductant is selected from the group consisting of $N_2H_4$; $NaBH_4$; $SNSO_4$; $CH_3OH$ and $H_2$.

16. A composite structure produced by the process of claim 1.

17. A process for producing a thin, in situ metallic electrocatalytic film proximate the surface of a solid polymer electrolyte membrane to form a composite structure useful in promoting chemical reactions in fuel cells, sensors, chloralkali processes, dialysis, or electrochemical synthesis cells, said method comprising the steps of:

impregnating a solid polymer electrolyte membrane by ion-exchange with a cationic salt of a selected electrode metal to produce a metal-cation-loaded membrane with a loading level of metal cations sufficient for forming an electronically coherent film of metal particles in electrical contact with one another within the membrane;

exposing at least one face of the metal-cation-loaded membrane to a chemical reductant to cause the cations in the membrane to diffuse toward the exposed face and to reduce the cations to the metal (0) state while within the membrane, and to produce within the ionomer matrix of the membrane an electronically coherent porous electrocatalytic film of metal predominately within the membrane and near its surface; and controlling the thickness and morphology of the electrocatalytic film and the electrochemical activity of the resultant composite structure by controlling the loading-level in the impregnating step, and by controlling the temperature, chemical nature and concentration of the reductant.

18. A composite metal-ionomer catalytic electrode structure characterized by large surface-area-per-unit volume of the electrode material and protection of the electrode from chemical and mechanical degradation by forming the same within the membrane, said structure comprising:

an ionomer matrix forming a solid polymer electrolyte membrane, said membrane having at least one face; and a thin, porous electronically coherent film of metal located predominately within the membrane and near one face of the membrane, said film being formed in situ within the ionomer matrix and having a morphology characterized by metal particles that provide a large surface-area-per-unit volume for ion exchange, and are in electrical contact with each other.

19. A composite metal-ionomer catalytic electrode as claimed in claim 18 wherein said metal particles form a dendritic morphology.

20. A composite metal-ionomer catalytic electrode as claimed in claim 18 wherein the metal composition of the film is selected from the group consisting of a single metal, an alloy and a mixed metal.

21. A composite metal-ionomer catalytic electrode as claimed in claim 18 wherein said film has a thickness on the order of 2–10 microns.

22. A composite metal-ionomer catalytic electrode as claimed in claim 18 wherein said membrane has two faces and a film as recited is formed proximate each face, thereby producing a bi-polar structure.

23. A chloralkali process of the type wherein respective anode and cathode reaction zones are separated by a solid polymer electrolyte membrane, said process comprising the steps of:
   providing a cathode reaction zone suitable for conducting a gas phase reaction therein;
   providing an anode reaction zone suitable for conducting a liquid phase reaction therein;
   providing, in the space between the anode and cathode reaction zones, a bi-polar structure comprising a solid polymer electrolyte membrane with a thin, porous, electronically conductive, high-surface-area metallic electrocatalytic film of metal particles formed in situ within the ionomer matrix at each surface thereof, where the particles are in electrical contact with one another;
   connecting the films of the bi-polar structure to a power supply so that one film serves as the anode and one film serves as the cathode;
   introducing acidified brine into the anode reaction zone;
   introducing an oxygen containing gas into the cathode reaction zone;
   conducting the following half cell reaction at the anode:

$$4Cl^- \rightarrow 2Cl_2 + 4e^-;$$

conducting the following half cell reaction at the cathode:

$$O_2 + 4H^+ + 4e^- \rightarrow 2H_2O;$$

utilizing the high surface area of contact between the ionomer matrix of the solid polymer electrolyte and the electrodes to facilitate the reactions;
   removing chlorine gas and spent brine from the anode reaction zone; and
   removing $H_2O$ plus any excess gas from the cathode reaction zone.

24. A process for producing an in situ metallic electrocatalytic film proximate the surface of a solid polymer electrolyte membrane to form a composite structure useful in promoting electrochemical reactions in fuel cells, sensors, chloralkali processes, dialysis, electrochemical synthesis cells, said method comprising the steps of:
   impregnating a solid polymer electrolyte membrane with metal ions to produce a metal-ion-loaded membrane, said metal ions being selected as those which will constitute the chemical composition of the electrocatalytic film;
   controlling the loading of the metal ions in the impregnating step to provide a loading of metal ions sufficient for forming an electronically coherent film of metal within the ionomer matrix; and
   exposing at least one face of the metal-ion-loaded membrane to a chemical reductant to cause the metal ions in the membrane to diffuse towards the exposed face and to reduce the ions to the metal (0) state while within the membrane and to form in situ within the ionomer matrix of the membrane of the solid polymer electrolyte membrane an electrocatalytic porous film located predominately within the membrane and near its surface having a morphology characterized by metal particles that provide a large surface-area-per-unit volume and which are in electrical contact with each other.

* * * * *